(12) United States Patent
Smith et al.

(10) Patent No.: US 12,502,096 B2
(45) Date of Patent: Dec. 23, 2025

(54) RELATION TO BREATH COLLECTION

(71) Applicant: Bedfont Scientific Limited, Maidstone (GB)

(72) Inventors: Jason Trevor Christopher Smith, Maidstone (GB); Scott Deamer-Smith, Maidstone (GB)

(73) Assignee: Bedfont Scientific Limited, Maidstone (GB)

( * ) Notice: Subject to any disclaimer, the term of this patent is extended or adjusted under 35 U.S.C. 154(b) by 510 days.

(21) Appl. No.: 18/027,573

(22) PCT Filed: Sep. 22, 2020

(86) PCT No.: PCT/CN2020/116927
§ 371 (c)(1),
(2) Date: Mar. 21, 2023

(87) PCT Pub. No.: WO2022/061550
PCT Pub. Date: Mar. 31, 2022

(65) Prior Publication Data
US 2023/0337935 A1     Oct. 26, 2023

(51) Int. Cl.
*A61B 5/08*     (2006.01)
*A61B 10/00*     (2006.01)

(52) U.S. Cl.
CPC ...... *A61B 5/082* (2013.01); *A61B 2010/0087* (2013.01)

(58) Field of Classification Search
None
See application file for complete search history.

(56) References Cited

U.S. PATENT DOCUMENTS 11,497,414 B1 * 11/2022 Smith .................. G01N 33/497
2017/0119280 A1    5/2017 Ahmad et al.
(Continued)

FOREIGN PATENT DOCUMENTS

CN     102335014 A     2/2012
CN     202903549 U     4/2013
(Continued)

OTHER PUBLICATIONS

International Search Report dated Jun. 18, 2021 for PCT Application No. PCT/CN2020/116927.
(Continued)

*Primary Examiner* — Jay B Shah
(74) *Attorney, Agent, or Firm* — EIP US LLP

(57) ABSTRACT

A breath-sample contained (100) comprising an inlet (102) for receiving a breath sample, a wall (104) at least partially defining a chamber (106) for containing the breath sample, and a valve (110) between the inlet (102) and the chamber (106). The valve (110) is in fluid communication with the inlet (102) and the chamber (106), and is configurable between at least a first open configuration (110a) for flow of breath sample from the inlet (102) to the chamber (106) up to a first flow rate, and a second open configuration (110b) for flow of breath sample from the inlet (102) to the chamber (106) at a second flow rate greater than the first flow rate. Once the valve (110) has been configured in the second open configuration (110b), the valve (110) cannot then reconfigure itself to the first open configuration (110a).

20 Claims, 8 Drawing Sheets

(56) References Cited

U.S. PATENT DOCUMENTS

2017/0347918 A1 12/2017 Arsenault
2020/0229799 A1 7/2020 Ma et al.

FOREIGN PATENT DOCUMENTS

| CN | 107036852 | A | 8/2017 |
| CN | 209542209 | U | 10/2019 |
| CN | 110603069 | A | 12/2019 |
| CN | 111526790 | A | 8/2020 |
| EP | 0127259 | A1 | 12/1984 |
| EP | 3202321 | A1 | 8/2017 |
| JP | H10108849 | A | 4/1998 |
| WO | 2006024941 | A2 | 3/2006 |
| WO | 2013026902 | A1 | 2/2013 |
| WO | 2017147687 | A2 | 9/2017 |

OTHER PUBLICATIONS

International Supplementary Search Report dated Dec. 20, 2022 for PCT Application No. PCT/CN2020/116927.
Notice of Issuance dated May 9, 2023 for Chinese Patent Application No. 2020800280275.

\* cited by examiner

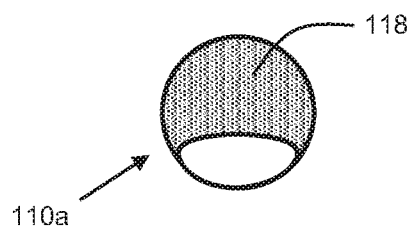
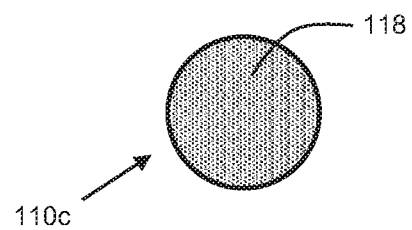
Fig. 5A    Fig. 5B
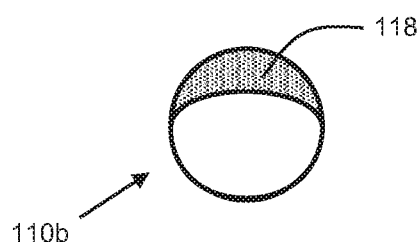
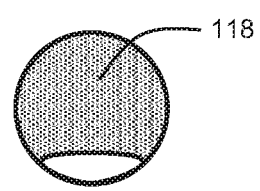
Fig. 5C    Fig. 5D
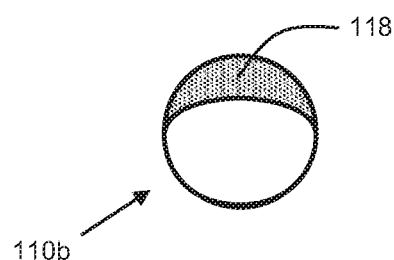
Fig. 5E

RELATION TO BREATH COLLECTION

CROSS-REFERENCE TO RELATED APPLICATIONS

This application is a 371 of International Application No. PCT/CN2020/116927, filed Sep. 22, 2020. The above-referenced patent application is incorporated by reference in its entirety.

BACKGROUND

Breath samples exhaled from the lungs of subjects can be collected in breath-sample containers for later testing and analysis. A collected breath sample may be extracted from the breath-sample container and analysed by detecting the concentration of an analyte indicative e.g. of a disease in the breath sample.

It is desirable to improve apparatus for collecting a breath sample.

BRIEF DESCRIPTION OF THE DRAWINGS

FIGS. 4A to 4E show schematically the method of FIGS. 3A to 3E, the breath-sample container shown as a cross-section of the breath-sample container shown in FIG. 1 along the plane B-B.

FIGS. 5A to 5E show schematically the valve position in the method of FIGS. 3A to 3E, shown from the inlet of the breath-sample container along the axis C-C.

DETAILED DESCRIPTION

Figure 1:
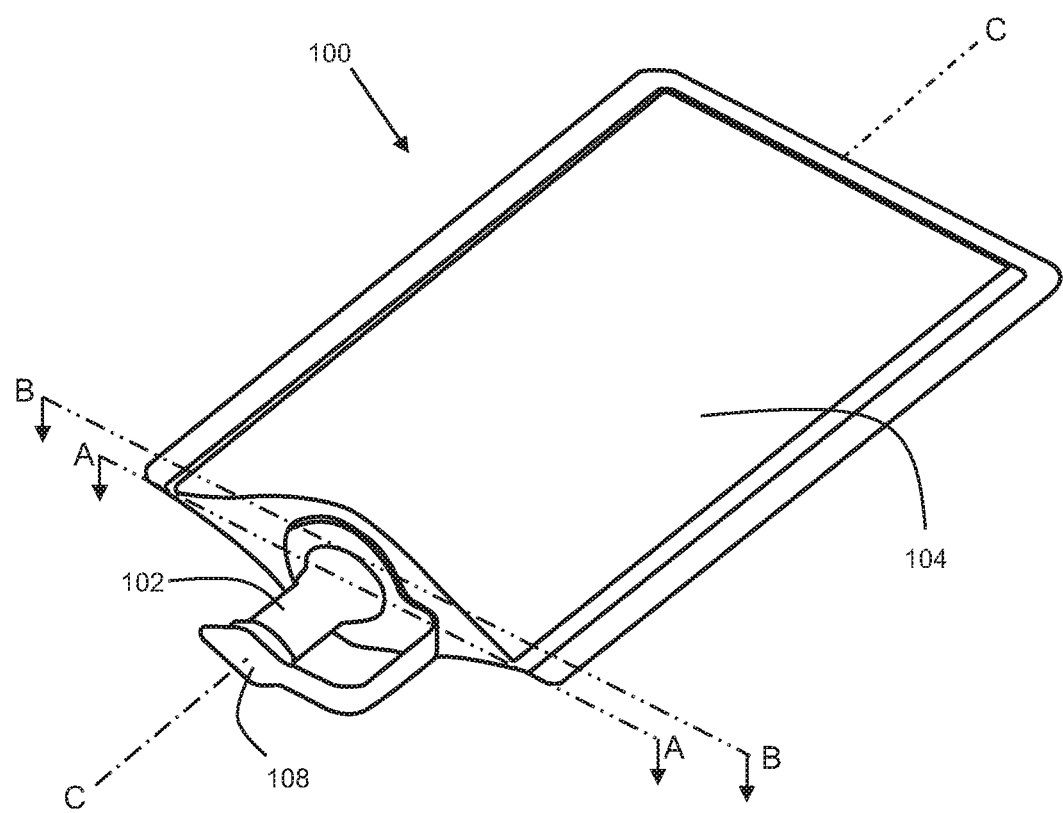
FIG. 1 shows schematically a perspective view of a breath-sample container according to examples.

Breath-sample analysers for analysing the concentration of an analyte in a breath sample are known. Many breath-sample analysers are operated by a patient directly providing a breath sample to the breath-sample analyser by creating a seal with their lips around an inlet or mouthpiece of a breath-sample analyser and exhaling into the breath-sample analyser. However, collecting a breath sample in a breath-sample container for subsequent analysis by a breath-sample analyser allows for greater freedom in breath sample collection, e.g. the breath sample can be collected physically apart from the breath-sample analyser.

Examples described herein relate to a breath-sample container for containing a breath sample. Once collected in the breath-sample container, the breath sample can be provided to a breath-sample analyser to analyse a concentration of an analyte in the breath sample. Examples described herein allow the breath sample to be collected at a different physical and/or temporal location from the breath analysis, and thus do not necessarily require a patient to come into physical contact with the breath-sample analyser and/or other people while providing the breath sample.

However, despite the advantages associated with collecting breath samples via breath-sample containers, users can be motivated to use such breath-sample containers contrary to the supplier's instructions in order to reduce the perceived cost involved. For example, clinicians can be motivated to re-use breath-sample containers across a plurality of breath samples, and/or across a plurality of patients.

Re-use of a breath-sample container to collect further breath samples (e.g. collecting a breath sample in a breath-sample container which has previously contained a breath sample) typically leads to contamination of the further breath samples—at least some analyte molecules from the first breath sample typically remain in the chamber of the breath-sample container even after the breath sample has been removed from the chamber—thereby reducing the accuracy of subsequent breath sample analyses. The inventors have devised a breath-sample container less suitable and/or less usable for collecting more than one breath sample, thereby reducing the risk of contamination of breath samples and improving the accuracy of determining an amount of analyte in a given breath sample.

According to examples, there is provided a breath-sample container comprising an inlet for receiving a breath sample, a wall at least partially defining a chamber for containing the breath sample, and a valve between the inlet and the chamber. The valve is in fluid communication with the inlet and the chamber. In these examples, the valve is configurable between at least a first open configuration for flow of breath sample from the inlet to the chamber up to a first flow rate, and a second open configuration for flow of breath sample from the inlet to the chamber at a second flow rate greater than the first flow rate. Once the valve has been configured in the second open configuration, the valve cannot then reconfigure itself to the first open configuration.

Typically, because the valve cannot reconfigure itself to the first open configuration once it has been configured in the second open configuration, the breath-sample container is less suitable and/or less usable for collecting a breath sample once the valve has been configured in the second open configuration. For example, once the breath-sample container has been configured in the second open configuration (e.g. during extraction of the breath sample from the chamber), the breath-sample container cannot again receive an acceptable breath sample because a greater proportion of contaminates can be supplied to the chamber from a user exhaling into the breath-sample container compared with the breath-sample container which can reconfigure itself in the first open configuration (e.g. saliva, particulate matter, and/or analyte deriving from an undesired area of the airway).

In examples, the valve is further configurable to a closed configuration. In some examples, the valve is configurable from the closed configuration to the first open configuration by a breath sample flowing from the inlet to the chamber. In some examples, the valve is reconfigurable from the first open configuration to the closed configuration by cessation of the breath sample flowing from the inlet to the chamber. In some examples, once the valve has been configured in the second open configuration, the valve cannot then reconfigure itself to the closed configuration.

Typically, because the valve cannot reconfigure itself to the closed configuration once it has been configured in the second open configuration, the breath-sample container is even less suitable and/or less usable for collecting a breath sample again once the valve has been configured in the second open configuration. For example, once the breath-sample container has been configured in the second open configuration (e.g. during extraction of the breath sample from the chamber), the valve cannot substantially prevent loss of breath sample from the chamber, or substantially prevent contamination of the breath sample in the chamber by contaminants entering the chamber from the atmosphere.

In some examples, the valve is configurable to the second open configuration by irreversible deformation of the valve. For example, the irreversible deformation comprises snapping or breaking a portion of the valve, and/or stretching a portion of the valve.

In examples, the wall of the breath-sample container is substantially impermeable to nitric oxide (NO), hydrogen ($H_2$), and/or methane ($CH_4$).

In examples, there is provided a breath sample kit comprising the breath-sample container and a valve opener engageable with the breath-sample container in a substantially gas-tight manner for flow of breath sample from the chamber towards the inlet of the breath-sample container. Part of the valve opener is configured to have opened the valve to the second open configuration once the valve opener has been engaged with the breath sample container in the substantially gas tight manner.

Examples are now described in detail with reference to the Figures.

Figure 2A:
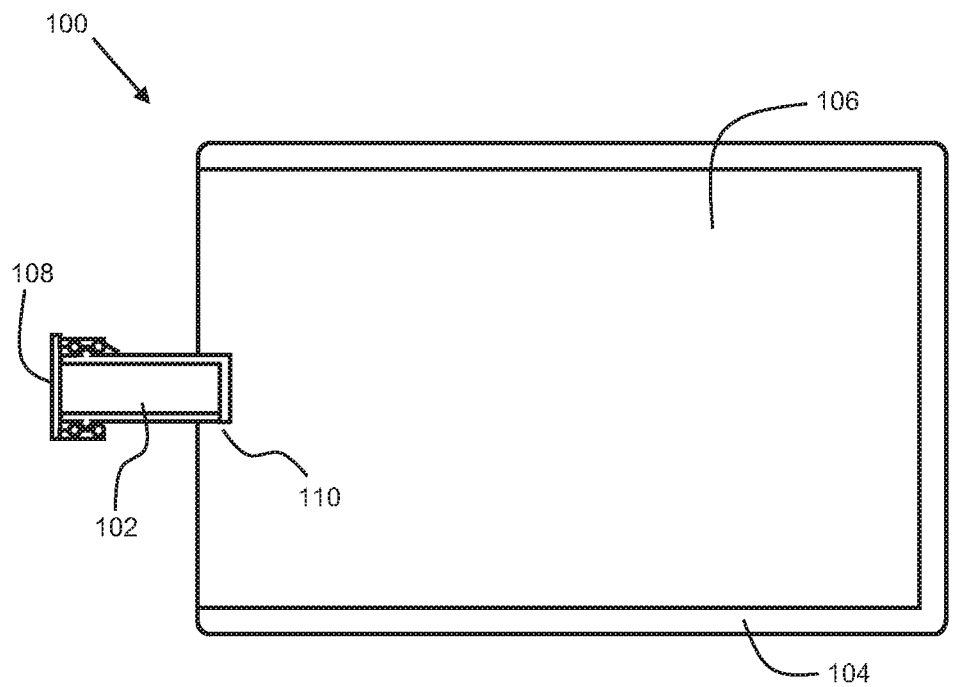
FIGS. 2A and 2B show schematically a cross-section of the breath-sample container shown in FIG. 1 along the plane A-A.
Figure 2B:
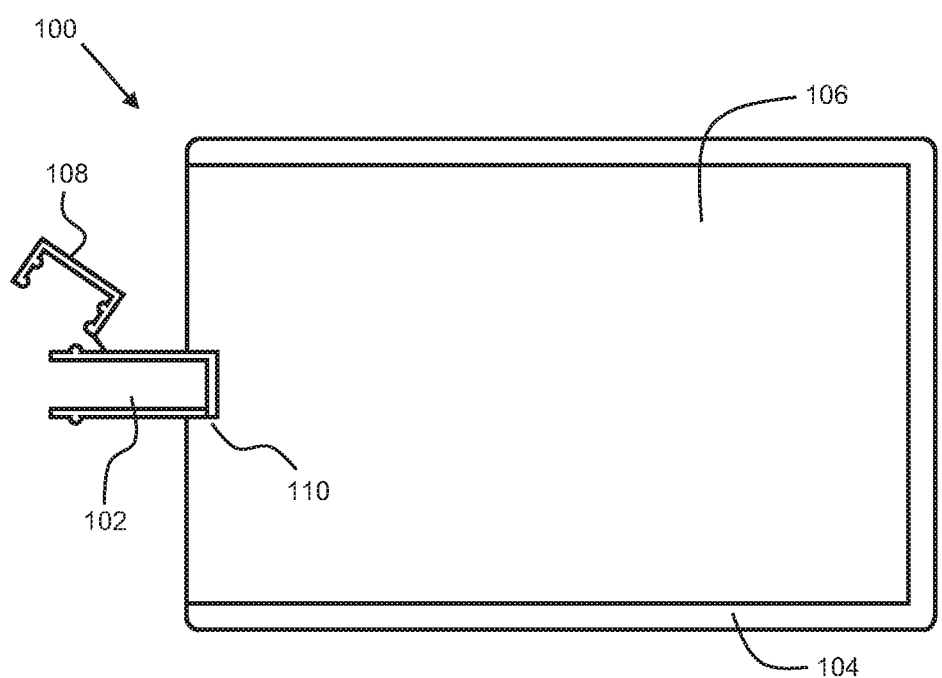

FIGS. 1, 2A and 2B show schematically a breath-sample container 100 according to examples. The breath-sample container 100 comprises an inlet 102 for receiving a breath sample and a wall 104 at least partially defining a chamber 106 for containing the breath sample (e.g. the wall 104 encloses the chamber 106, which may otherwise be considered a void). A breath-sample container can be considered as apparatus configured to contain or hold a collected breath-sample. In some examples it is envisaged that such a container may be used for collection of other gaseous or even liquid samples beyond breath samples.

The inlet 102 typically functions at least as part of a mouthpiece. For example, to supply a breath sample to the chamber 106, the human subject creates a seal with their lips around the inlet, and then exhales. The inlet may extend into the subject's oral cavity, e.g. into the subject's oral cavity proper, via the orifice of the mouth.

The inlet 102 is for example a tube or conduit sealed at or towards one end to the wall 104. The other end is for inserting through the orifice of the human subject's mouth, and an outer surface of the tube may be formed to provide a ridge, edge or other structure to act as a stop so the human subject inserts the tube or conduit through the orifice of the mouth, until their lips engage with the ridge, edge or other structure, so that the tube or conduit extends into their oral cavity proper to a desired amount for breath sample collection. The ridge, edge or other structure may be shaped to provide a gas tight seal when engaged with the lips.

The wall 104 comprises a material substantially impermeable to gas, so the gas sample does not diffuse or leak from the breath-sample container 100, and atmospheric gases do not pass into the container 100, during a reasonable period of time (e.g. 7 days, or 14 days) before the breath sample is transferred to a breath-sample analyser. In examples, the material is substantially impermeable to particular analyte(s) (e.g. a statistically significant amount of analyte does not cross the wall from the chamber 106 to the atmosphere or vice versa) during a reasonable period of time (e.g. 7 days, or 14 days), and/or particular component(s) of the atmosphere which negatively affect accurate measurement of the particular analyte(s). For example, the material is substantially impermeable to nitric oxide (NO), hydrogen ($H_2$), and/or methane ($CH_4$).

In some examples the wall 104 is flexible such that the volume of the chamber 106 can be increased and decreased. The chamber 106 is for example at least partially evacuated (e.g. of gas) before collection of the breath sample from a patient.

In some examples, the breath-sample container comprises a folded sheet of material, a first wall of the breath-sample container comprising a first portion of the sheet and a second wall of the breath-sample container comprising a second portion of the sheet opposite the first portion of the sheet. For example, the wall 104 which at least partially defines the chamber 106 is manufactured from a single sheet of material which is folded to have two overlapping portions. The sheet is folded such that the first and second portions overlap and a portion of the edge of the sheet at a first end of the sheet contacts the edge of the sheet at a second, opposite end of the sheet, and the first and second wall are sealed along the edge of the sheet to enclose the chamber 106, e.g. the portions are heat-sealed along the edge of the sheet to enclose the chamber 106. By forming the wall 104 from a folded sheet of material, the total extent of sealed edge is less than a comparable breath-sample container formed from two separate opposing sheets and sealed along the edges to enclose a chamber, thereby reducing the risk of breath sample leaking from the chamber 106 to the atmosphere through a sealed edge of the breath-sample container 100.

The breath-sample container in some examples comprises a lid 108 for closing the end of the inlet 102 around which the human subject creates a seal with their lips before exhaling. The lid 108 at least partially reduces contamination of a breath sample contained within the chamber 106 or loss of breath sample contained within the chamber 106 by providing a physical barrier between the interior of the breath-sample container 100 and the atmosphere. In examples, the lid 108 receives the inlet 102 in an aperture of the lid 108, e.g. a wall of the lid 108 surrounds a portion of an external surface of the inlet 102 such that an internal surface of the wall contacts the external surface of the inlet. The lid 108 of these examples can result in a lower level of breath sample contamination compared with breath-sample containers which include a lid that is inserted into the inlet (there is less contact with the internal wall of the inlet). Further, a user can find the lid 108 of these examples easier to operate as the lid can be pulled off the external surface of the inlet 102 rather than relying only on a small pull tab to remove the lid from the inlet.

The breath-sample container 100 comprises a valve 110 between the inlet 102 and the chamber 106, in fluid communication with the inlet 102 and the chamber 106. The valve 110 is an element for controlling the passage of fluid (e.g. gas) from the inlet 102 to the chamber 106. In examples, the valve 110 comprises a first part which can move relative to a second part to control the passage of fluid through the valve 110. For example, the first part can move relative to the second part to allow passage of fluid through the valve 110, at least partially restrict passage of fluid through the valve 110, and/or substantially prevent passage of fluid through the valve 110. The valve 110 is configurable between at least a first open configuration 110a and a second open configuration 110b, as shown in FIGS. 3 to 6.

In the first open configuration 110a, the inlet 110 provides an aperture through which breath sample can flow from the inlet 102 to the chamber 106 (see FIGS. 3A, 4A, 5A and 6A). The first open configuration 110a is for flow of breath sample from the inlet 102 to the chamber 106 up to a first flow rate. The first flow rate is for example a maximum rate at which fluid can flow from the inlet 102 through the valve 110 in the first open configuration 110a to the chamber 106. In examples, the first open configuration 110a restricts the flow of breath received at the inlet 102 to the chamber 106, such as where the flow of breath received at the inlet 102 is greater than the maximum flow rate (e.g. the first flow rate) allowed by the valve 110 in the first open configuration 110a. In other examples, the first open configuration 110a does not substantially restrict the flow of breath received at the inlet 102 to the chamber 106, such as where the flow of breath received at the inlet 102 is equal to or less than the maximum flow rate (e.g. the first flow rate) allowed by the first open configuration 110a.

With the first open configuration 110a restricting the flow of breath received at the inlet 102 to the chamber 106, the restriction of the flow rate provided by the valve 110 in its first open configuration 110a e.g. provides a backpressure against the subject's exhalation 112.

When collecting a breath sample for identifying a certain medical condition, the analyte for detection in some examples should derive from the lower airway and/or the lungs, and should not be contaminated with analyte deriving from the nasal portion of the airway (e.g. nasal analyte). The amount of contaminating nasal analyte in a breath sample can be reduced by closing the velum (soft palate) of the subject during exhalation of the breath sample. The velum of the subject can be closed by the subject exhaling against a backpressure sufficient to close the velum e.g. 5 to 20 mbar (millibar) or 8 to 15 mbar of backpressure. Such a backpressure can be generated by limiting the flow rate of the subject-exhalate. For example, exhaling through a small aperture of the valve 110 which reduces the flow-rate of the sample compared with the flow-rate as it leaves the subject creates a backpressure for the subject to exhale against.

For example, the subject can provide an exhalate 112 having a flow rate of 50±5 ml/s (millilitres per second) to the inlet 102 (e.g. standard subject exhalation conditions). The first open configuration 110a of the valve 110 for example restricts the flow rate of the breath sample (indicated in FIGS. 3A, 4A and 6A with dashed lines) to the first flow rate. In examples, the first flow rate is 6 L/min (litres per minute) or less (e.g. 5, or 4 L/min or less). The first open configuration 110a for example restricts the exhalate 112 to the first flow rate by virtue of the aperture size associated with the first open configuration 110a. Under standard subject exhalation conditions, the aperture of the valve 110 in the first open configuration 110a in examples has a maximum cross-sectional area of 35 mm² (square millimetres).

In examples, the breath-sample container is for containing a breath sample which is to be analysed for its nitric oxide (NO) content. The detection of exhaled NO is used for the identification of inflammation in the lungs and airways, e.g. for the diagnosis of asthma and other inflammatory conditions.

When collecting a breath sample for identifying inflammatory conditions such as asthma, the collected NO should derive from the lower airway and/or the lungs, and thus should not be contaminated with NO deriving from the nasal portion of the airway (e.g. nasal NO). The amount of contaminating nasal NO in a breath sample can be reduced by closing the velum during exhalation of the breath sample.

In examples, the valve 110 is also configurable in a closed configuration 110c. The valve 110 in the closed configuration 110c substantially prevents flow of breath sample from the chamber 106 to the inlet 102 (see FIGS. 3B, 4B, 5B, and 6B), e.g. where the breath-sample container 100 is subject to an external pressure of approximately 1 atm (atmosphere), the closed configuration restricts the flow of breath sample from the chamber 106 to then inlet 102 to entirely or substantially (within acceptable tolerances) prevent flow of breath sample from the chamber 106 to the inlet 102. In examples, at least before the valve is configured in the second open configuration 110b, the valve 110 is biased towards the closed configuration 110c such that, in the absence of a subject supplying a breath sample to the inlet 102, the valve 110 configures itself in the closed configuration 110c. For example, the valve 110 reconfigures itself from the first open configuration 110a to the closed configuration 110c by cessation of a breath sample flowing from the inlet to the chamber. In examples, the valve 110 is as a one-way valve (e.g. a check valve). The bias of the valve 110 towards its closed configuration 110c can be enhanced when the chamber 106 contains a breath sample which exerts pressure on the valve 110 in a direction from the chamber 106 to the inlet 102. The valve 110 being biased towards the closed configuration 110c before it is configured in the second open configuration 110b further substantially prevents flow of gas from or into the chamber 106 except when being supplied with a breath sample from a subject, thereby reducing contamination from the atmosphere or loss of sample before analysis. Moreover, the bias of the valve 110 reduces contamination of the sample even if the lid 108 (in some examples) is not immediately engaged with the inlet 102 after providing the sample, because the valve 110 will not reconfigured itself to an open configuration under standard (atmospheric) pressure. Thus, in examples, the need for a manual lid to close the breath-sample container 110 is obviated.

The valve 110 configures to the first open configuration 110a from the closed configuration 110c upon a breath sample flowing from the inlet to the chamber, e.g. the inlet receiving a breath sample exhaled from a subject which meets or exceeds a pressure threshold/exhalate flow rate. For example, the valve 110 is configurable from the closed configuration 110c to the first open configuration 110a by a breath sample flowing from the inlet to the chamber where the breath sample is supplied to the inlet from a subject under standard subject exhalation conditions (e.g. the subject exhaling at a flow rate of 50±5 ml/s).

Figure 3A:
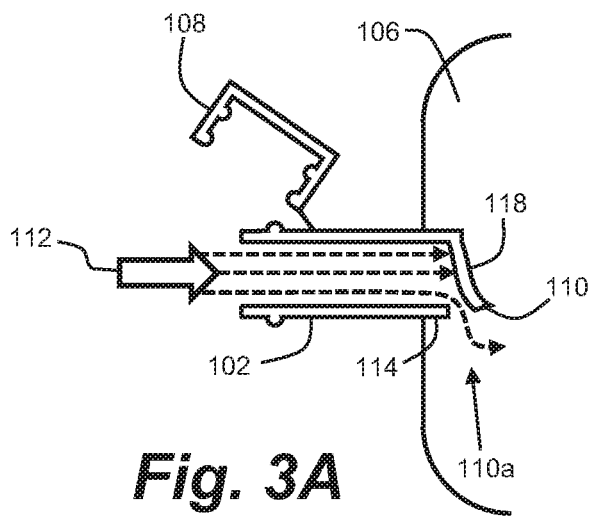
FIGS. 3A to 3E show schematically a method of supplying a breath sample to, and extracting the breath sample from, a breath-sample container according to example methods, the breath-sample container shown as a cross-section of the breath-sample container shown in FIG. 1 along the plane A-A.
Figure 3B:
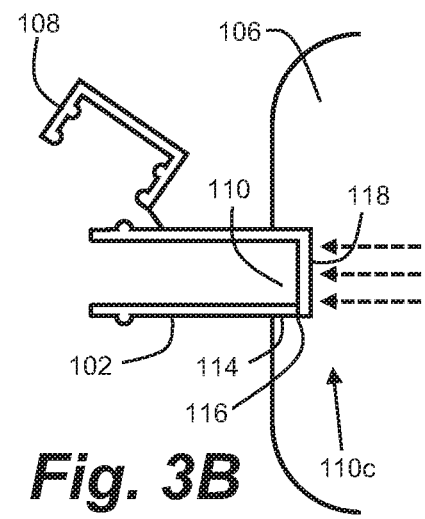
Figure 3C:
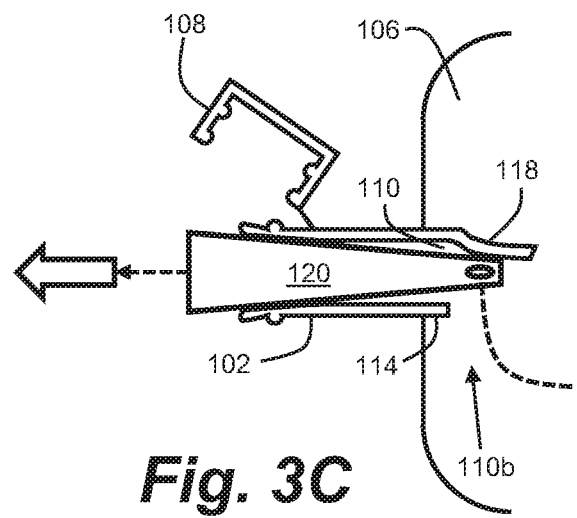
Figure 3D:
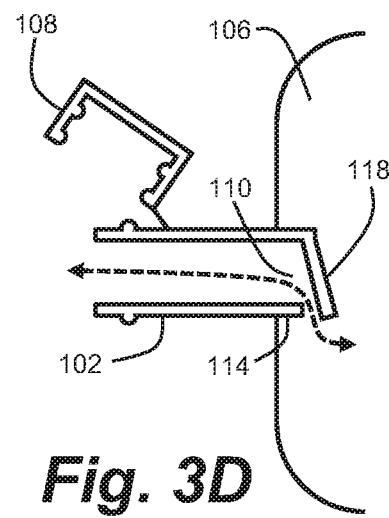

In the second open configuration 110b, the inlet 110 provides an aperture through which breath sample can flow from the inlet 102 to the chamber 106 at a second flow rate (see FIGS. 3C and E, 4C and E, 5C and E, and 6F). The second flow rate is greater than the first flow rate of the first configuration 110a. In some examples, the second open configuration 110b restricts the exhalate 112 received by the inlet to the second flow rate, and the restriction provided by the second open configuration is less than the restriction provided by the first open configuration. In some examples, the second open configuration 110b provides substantially no, or no, restriction to the breath sample received by the inlet 102 e.g. under standard exhalation conditions the valve 110 does not reduce the flow of fluid through the valve (within acceptable tolerances).

The aperture through which breath can flow when the inlet 110 is in the second open configuration 110b has a greater cross-sectional area than the maximum cross-sectional area in the first open configuration 110*a*. Under standard subject exhalation conditions (e.g. the subject exhaling at a flow rate of 50±5 ml/s), the aperture of the valve 110 in the second open configuration 110*b* in examples has a minimum cross-sectional area greater than 35 mm² (square millimetres).

Because the second open configuration 110*b* allows for a greater flow rate through the valve 110 (e.g. the second open configuration 110*b* provides less restriction to the exhalate 112 than the first open configuration 100*a*, or substantially no restriction to the exhalate 112), the valve 110 in the second open configuration 110*b* in some examples does not provide sufficient backpressure against the subject's exhalation 112 to close the subject's velum during exhalation into the inlet 102. That is, the second flow rate is not sufficiently reduced compared with the subject's exhalate 112 to provide sufficient backpressure to close the subject's velum during exhalation. Accordingly, where the breath-sample container is for collecting breath samples which should not be contaminated with analytes from the nasal area (e.g. when collecting breath samples for NO-concentration analysis), the valve in the second open configuration 110*b* is not suitable for obtaining an acceptable breath sample.

For example, after the valve 110 being configured in the second open configuration 110*b*, the subject can provide an exhalate 112 having a flow rate of 50±5 ml/s (millilitres per second) to the inlet 110. The breath sample flows through the valve 110 in the second open configuration 110*b* at the second flow rate. The second flow rate is the same as, or less than, the flow rate of the exhalate 112, and is greater than the first flow rate (indicated in FIGS. 3E, 4E and 6F with dashed lines). In examples, the second flow rate is at least 4 L/min (e.g. at least 6 L/min, or 7 L/min).

The valve 110 is configurable to the second open configuration 110*b* for extraction of breath sample from the chamber 106. For example, the act of extracting breath sample from the chamber 106 configures the valve 110 to the second open configuration 110*b*. In examples, the first open configuration 110*a* is not suitable for extracting a sample from the chamber 106 (e.g. the maximum flow rate from the chamber 106 to the inlet 102 which can be achieved via the valve 110 in the first open configuration 110*a* is too low to be supplied to a breath-sample analyser for accurate analysis). In examples, the valve 110 is configured to the second open configuration 110*b* by a valve opener (discussed hereinbelow) which can be considered e.g. to actuate or configure the valve to an open configuration.

Once the valve 110 has been configured in the second open configuration 110*b*, the valve 110 cannot then reconfigure itself to the first open configuration 110*a*. For example, the valve 110 is configured to the second open configuration 110*b* by irreversible deformation of the valve 110, e.g. snapping or breaking a portion of the valve, or stretching a portion of the valve. In examples, the irreversible deformation of the valve 110 provides a visible indication to a user that the valve has at least once been configured in the second open configuration 110*a*.

In configuring the valve 110 to the second open configuration 110*b* upon receiving a breath sample (e.g. a subject supplying a breath sample to the inlet under standard subject exhalation conditions), the valve 110 is configured via the first open configuration 110*a* position to the second open configuration position 110*b*, but it cannot remain at the first open configuration 110*a* for a significant duration of the exhalation where the breath sample is provided under standard subject exhalation conditions, e.g. the valve 110 cannot remain at the first open configuration 110*a* for more than 1 s (seconds), or 0.5 s, where the breath sample is provided to the inlet 102 at a flow rate of 50±5 ml/s.

Figure 3E:
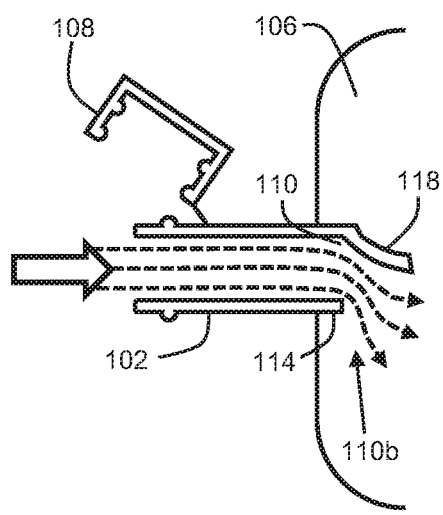
Figure 4E:
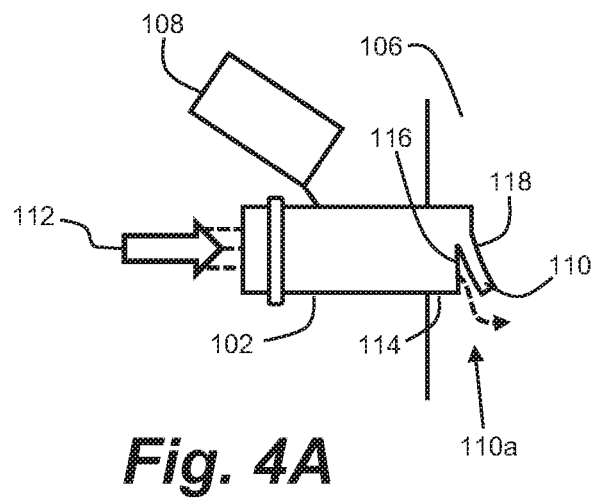
Figure 4E:
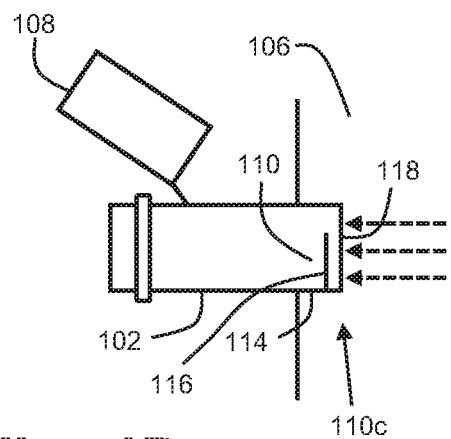
Figure 4E:
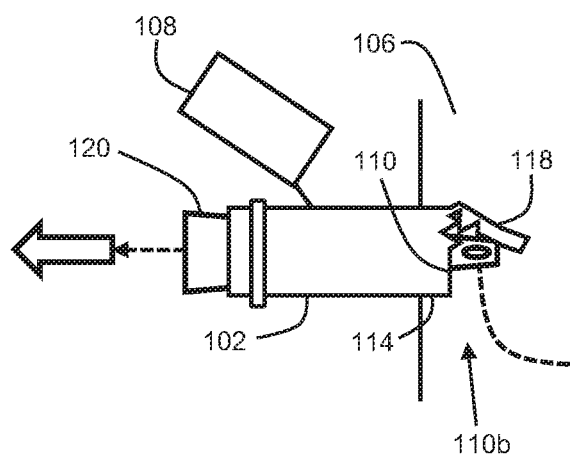
Figure 4E:
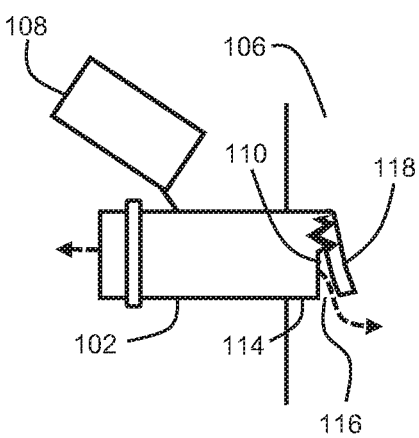
Figure 4E:
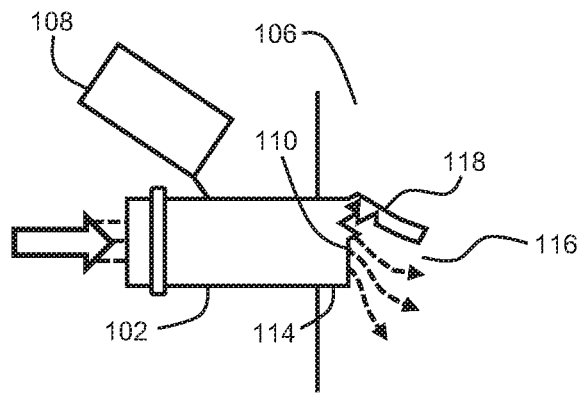
Figure 6A:
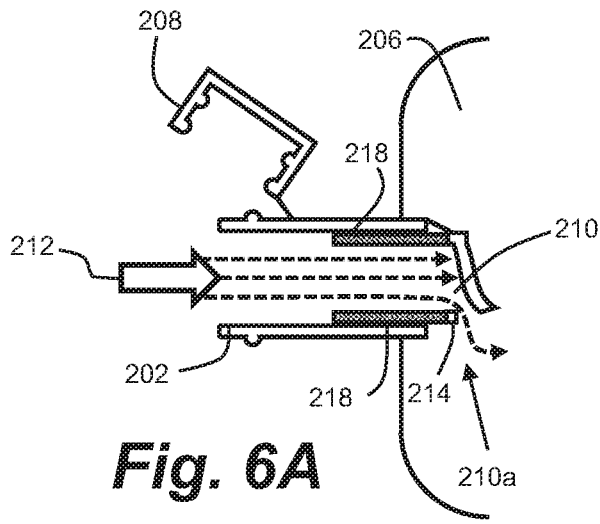
FIGS. 6A to 6F show schematically another method of supplying a breath sample to, and extracting the breath sample from, a breath-sample container according to example methods.
Figure 6B:
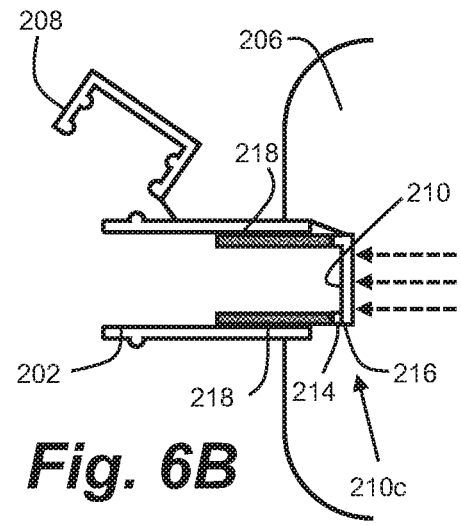
Figure 6C:
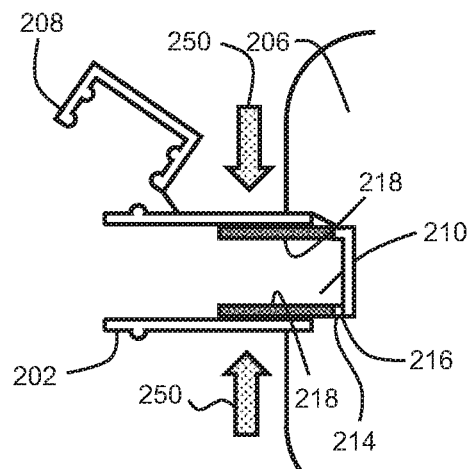
Figure 6D:
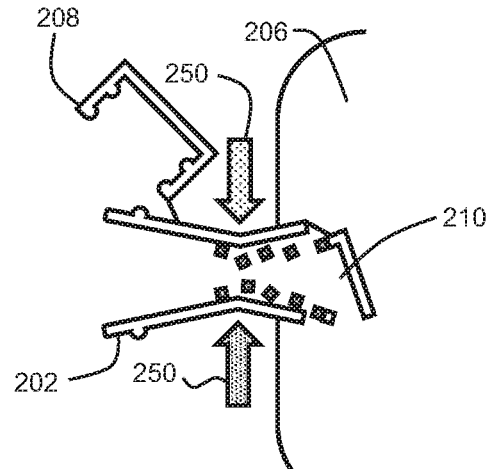
Figure 6E:
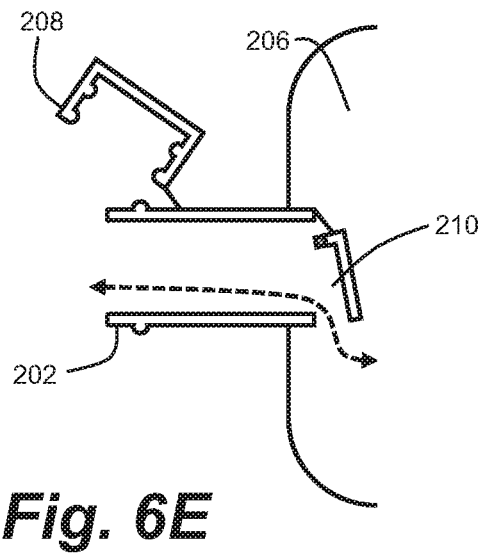
Figure 6F:
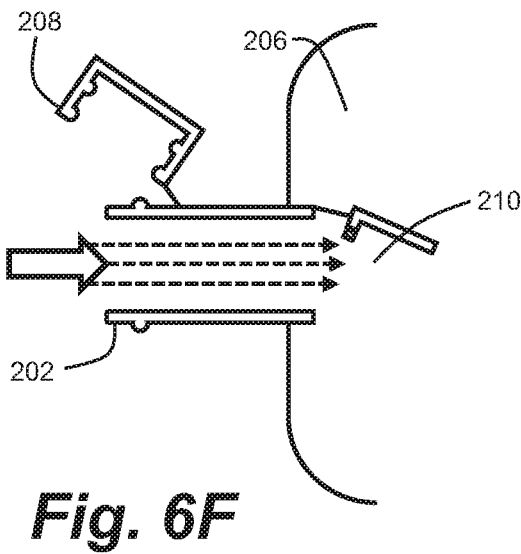

Because the valve 110 cannot reconfigure itself to the first open configuration 110*a* after being configured in the second open configuration 110*b* (e.g. cannot remain in the first open configuration during a significant duration of a subject supplying a breath sample to the inlet under standard subject exhalation conditions), the breath-sample container 100 can no longer be used to restrict the exhalation 112 of a subject to a first flow rate and thereby close the velum of the subject during exhalation once the valve 110 has been configured in the second open configuration 110*b* (indicated in FIGS. 3E, 4E and 6F).

Thus, in examples where extraction of the breath sample from the chamber 106 involves configuring the valve 110 to the second open configuration 110*b*, the extraction of the breath sample renders the breath-sample container 100 unsuitable for further use as a breath-sample container for containing a sample which should not be contaminated with nasal analyte (e.g. where the sample is to be analysed for its NO content). Accordingly, in these examples, the breath-sample container 100 can be considered a "one-use" breath-sample container that should be discarded after extracting one breath sample from the chamber 106, because the breath-sample container 100 no longer closes the velum of the subject during exhalation and is thus no longer suitable for receiving an acceptable breath sample. Because a "one-use" breath-sample container 100 cannot be re-used to collect further breath samples after extracting the first breath sample, contamination between breath samples is avoided. Similarly, because a "one-use" breath-sample container 100 cannot be used across multiple patients, cross-contamination between patients is avoided.

In examples, where the valve 110 is configurable in the closed configuration 110*c*, once the valve 110 has been configured in the second open configuration 110*b* the valve 110 is no longer, or is less, biased towards the closed configuration 110*c*. Once the valve 110 has been configured in the second open configuration 110*b*, the valve 110 cannot reconfigure itself to the closed configuration 110*c*. In examples, where the valve 110 is a one-way valve, once the valve 110 has been configured in the second open configuration 110*b* the valve 110 no longer functions as a one-way valve. So, the valve 110 cannot reconfigure itself to substantially prevent flow of breath sample from the chamber 106 to the inlet 102. Accordingly, the breath-sample containers 100 of these examples can also be considered "one-use" breath-sample containers, as it is not possible to retain breath sample in the chamber 106 without also engaging a lid 108 with the inlet 102. A period of time elapses between cessation of providing a breath sample to the breath-sample container and engaging the lid 108, thus allowing for contamination of the breath sample of analyte present in the atmosphere, and loss of sample from the chamber 106.

In some examples, (e.g. those shown in FIGS. 3 to 5), the valve 110 comprises, between the inlet 102 and the chamber 106, a first portion 114 of a wall of the valve 110 comprising a slit 116 openable for the first open configuration 110*a* by sufficient pressure (e.g. pressure provided by a subject supplying a breath sample to the inlet 102 under standard subject exhalation conditions) on at least a second portion 118 of the wall of the valve.

As shown in FIGS. 3 to 5, the second portion 118 is a closed end of a tube against which pressure builds during exhalation to open the slit 116. In other examples (not shown), the first portion 114 and second portion 118 of the wall together form a closed side or end of a tube (e.g. a diaphragm), with a slit or aperture 116 positioned between the first portion 114 and the second portion 118 (e.g. in the centre of the diaphragm). In such examples or further examples, the first and/or second portions 114, 118 each function as a flap or displaceable portion of wall on one or both sides of the slit 116.

In FIGS. 3 to 5, where the valve 110 has not yet been configured in the second open configuration 110b, upon a breath sample being supplied to the inlet 102 under standard subject exhaling conditions, pressure builds on the second portion 118 (and possibly also the first portion 114) such that the second portion 118 (and possibly also the first portion 114) reversibly stretches towards the chamber 106, thereby opening the slit 116 (thereby providing an aperture through which breath sample can flow). Thus the valve 110 is in the first open configuration 110a (see FIG. 3A).

In these examples, upon cessation of the breath sample being supplied to the inlet 102 (see FIG. 3B), the first 114 and second 118 portions return to their unstretched states such that the first portion 114 of the wall contacts the second portion 118 of the wall and thus the slit 116 is closed, and the valve 100 is in the closed configuration 110c (e.g. the valve is entirely or substantially (within acceptable tolerances) closed to gas flow from the chamber 106 to the inlet 102).

The slit 116 is located at a first side of the valve 110. In some examples, on a second side of the valve opposite and/or immediately adjacent the first side, the valve 110 comprises a material irreversibly deformable by sufficient pressure on the second portion 118 of the wall of the valve. In examples, the material comprises an elastomeric plastic. The pressure which is sufficient to irreversibly deform the second portion 118 is different (e.g. greater) than that which is sufficient to reversibly stretch the second portion 118 where the valve 110 is configured to the first open configuration. The pressure on the second portion of the wall sufficient to irreversibly deform the valve is greater than that which can for example be provided by a subject exhaling into the inlet 102. In the example shown in FIG. 3C, pressure sufficient to irreversibly deform the second portion 118 is provided by engaging a valve opener 120 with the inlet 102 such that a part of the valve opener 120 irreversibly stretches the second portion 118 of the wall of the valve 110. Thus the valve 110 is in the second open configuration 110b.

FIGS. 6A to 6E schematically show a breath-sample container 200 according to some examples. Where a feature of the breath-sample container 200 corresponds to a feature of the breath-sample container 100 shown in FIGS. 3 to 5, the reference numeral for that feature in FIGS. 6A to 6E is increased by 100.

In some examples, such as those shown in FIGS. 6A to 6E, the irreversibly deformable material comprises a breakable (e.g. frangible) material. In examples, the second portion 218 of the valve can be broken upon a force 250 being applied to the second portion 118 of the valve 110.

In some unshown examples, the valve comprises a first portion and second portion of wall which together form a closed end of a tube (e.g. a diaphragm), with a slit or aperture positioned between the first portion and the second portion (e.g. in the centre of the diaphragm). Where the valve has not yet been configured in the second open configuration, upon a breath sample being supplied to the inlet under standard subject exhaling conditions, pressure builds on both the first portion and the second portion such that the first portion and second portion reversibly stretch toward the chamber, thereby opening the slit (thereby providing an aperture through which breath sample can flow). Thus the valve is in the first open configuration. Upon cessation of the breath sample being supplied to the inlet, the first and second portions return to their unstretched states such that the first portion of the wall contacts the second portion of the wall and thus the slit is closed, and the valve is in the closed configuration.

The valve of these examples, with at least some features similar to those shown in FIGS. 3A to 3F, comprises a material irreversibly deformable by sufficient pressure on the first and second portions of the wall of the valve. This valve is configurable to the second open configuration using the same valve opener 120 shown in FIG. 3C.

In other examples (not shown), the second portion alternatively or additionally function as a flap or a displaceable portion of wall either side of the slit. In these examples, the valve is configurable to the first open configuration by the slit being opened by the first and/or second portion reversibly stretching when a breath sample is supplied thereto. Alternatively or additionally, the valve is configurable to the first open configuration by the slit being opened through displacement of the first portion relative to the second portion, or vice versa.

As mentioned above, in examples the valve 110 is configurable to the second open configuration 110b by a valve opener. FIGS. 3A to 3E and 4A to 4E schematically show a breath-sample container 100 according to examples in combination with a valve opener 120. In these examples, the valve 110 is shown to be irreversibly deformed by stretching a portion of the valve 110 by the valve opener 114, however in other examples the valve opener 120 irreversibly deforms the valve 110 by any other means (e.g. snapping/breaking a portion of the valve).

Figure 7A:
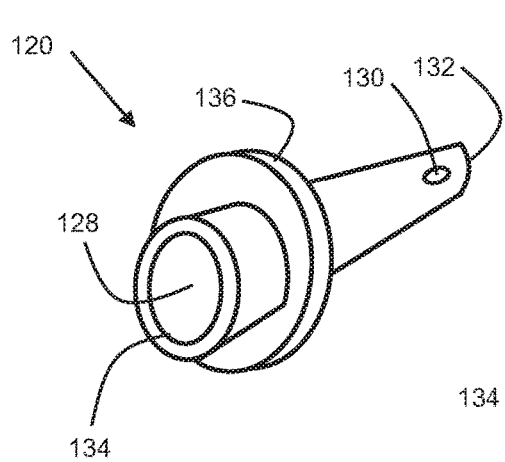
FIG. 7A shows schematically a valve opener according to examples.
Figure 7B:
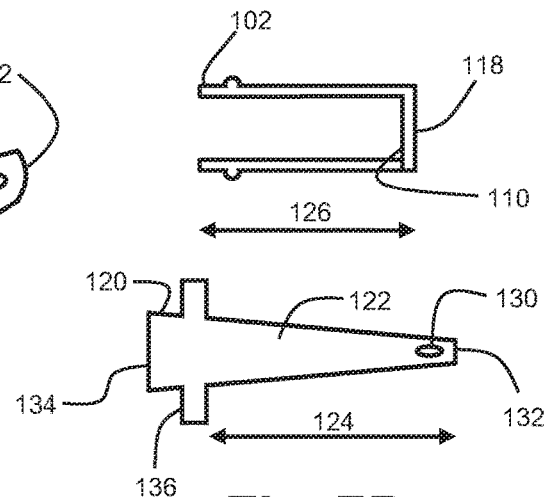
FIG. 7B shows a schematic comparison of the valve opener shown in FIG. 7A with a portion of the breath-sample container shown in FIG. 2B.

According to examples, there is provided a breath sample kit 300 comprising a breath-sample container 100 and a valve opener 120. The valve opener is engageable with the breath-sample container 100 in a substantially gas-tight manner for flow of breath sample from the chamber 106 towards the inlet 102 of the breath-sample container 100. A part 122 of the valve opener 120 is configured to have opened the valve 110 to the second open configuration 110b once the valve opener 120 has been engaged with the breath sample container 100 in the substantially gas tight manner. FIG. 7A shows schematically a valve opener 120 according to some examples in a perspective view; FIG. 7B shows schematically a comparison of a portion of the breath-sample container 100 and the valve opener 120.

The valve opener 120 engages with the breath-sample container 100 in a substantially gas-tight manner for flow of breath sample from the chamber towards the inlet of the breath-sample container so that, for example, breath sample can be extracted from the chamber 106 and delivered to a breath sample analyser without contaminating the sample with analyte present in the atmosphere and/or without losing a substantial amount of the breath sample.

In examples, the valve opener 120 is engageable with the breath-sample container 100 in a substantially gas-tight manner, e.g. where the breath-sample container 100 is subject to an external pressure of approximately 1 atm and the valve opener 120 is engaged with the breath-sample container 100, gas cannot flow (within acceptable tolerances) between the chamber 106 and the atmosphere via the contact area between the breath-sample container 100 and the valve opener 120. Hence, a gas-tight seal is formed between the breath-sample container and the valve opener 120 along at least a portion of the contact area between the breath-sample container 100 and the valve opener 120. The valve opener 120 is engageable with the breath-sample container 100 via, for example, a friction fit with the inlet 102, e.g. the mouthpiece of which the inlet 102 is a part comprises an elastomeric plastic such that the inlet 102 can adapt to the shape of the valve opener 120 (e.g. the mouthpiece of which the inlet 102 is a part is reversibly stretchable), thereby providing a gas-tight friction fit. Further, with the mouthpiece being reversibly stretchable, it can accommodate the valve opener 120 as it advances from the inlet 102 through the valve 110.

A part 122 of the valve opener 120 is configured to open the valve 110 to the second open configuration 110b once the valve opener 120 has engaged with the breath-sample container 100 in a substantially gas tight manner. In examples, the part 122 of the valve opener 120 is elongate. The elongate part 122 extends along a longitudinal axis sufficient such that the part 122 extends at least partially through the inlet 102 into the chamber 106 with the valve opener 120 engaged with the breath-sample container 100 in a substantially gas-tight manner. In extending through the inlet 102 into the chamber 106, the part 122 of the valve opener 120 configures the valve 110 to the second open configuration. As shown in FIG. 7B, the elongate part 122 has a longitudinal extent 124 greater than the distance 126 between the inlet 102 and (when in the closed configuration 110c) the portion 118 of the valve 110 which moves relative to the first part of the valve 110 when reconfiguring the valve.

The valve opener 120 allows for flow of breath sample from the chamber 106 towards the inlet 102 of the breath-sample container 100. In examples, the valve opener 120 provides a fluid conduit connecting the chamber 106 and the inlet of a breath sample analyser. In examples, the valve opener comprises a lumen 128 between at least one inlet 130, 132 and at least one outlet 134 of the valve opener 120. The valve opener 120 is configured such that, when the valve opener 120 is engaged with the breath-sample container 100 in a substantially gas-tight manner, the at least one outlet 134 is located outside of the chamber 106 and, in certain examples, outside of the breath-sample container 100 altogether. Accordingly, the valve opener 120 can be used as a fluid conduit to connect the chamber 106 and the inlet of a breath sample analyser. The at least one inlet 130, 132 is positioned close to or at the longitudinal extent of the elongate part 122 of the valve opener 120, such that with the valve opener 120 having opened the valve 110 to the second open configuration 110b, the at least one inlet 130, 132 of the valve opener 120 is located in the chamber 106 (see, for example, FIGS. 3C and 4C). In examples, with the valve opener 120 engaged with the breath-sample container 100 in a substantially gas-tight manner, the valve opener 120 comprises the lumen 128 which fluidly communicates the at least one inlet 130, 132 of the valve opener 120 located in the chamber 106 with the outlet of the valve opener outside of the chamber 106.

In examples, the at least one outlet 134 of the valve opener can be engaged with an inlet of a breath sample analyser in a substantially gas-tight manner, and the valve opener 120 engaged with the breath-sample container 100 in a substantially gas-tight manner such that at least one inlet 130, 132 is located in the chamber 106, such that a breath sample contained in the chamber 106 can flow from the chamber 106 to the inlet of the breath sample analyser via the at least one inlet 130, 132, the lumen 128, and the outlet 134 of the valve opener 120.

In examples, the part 122 of the valve opener 120 is tapered such that, with the valve opener 210 engaged with the breath-sample container 100 in a substantially gas-tight manner, the part 122 of the valve opener 120 tapers towards the valve 110. In these examples, the valve opener 120 is engageable with the breath-sample container 100 in a gas-tight manner before the valve 110 is reconfigured from the closed configuration 110c, thereby avoiding loss of breath sample during extraction of the breath sample, and avoiding contamination of the breath sample during extraction from analytes present in the atmosphere. In some examples where the valve opener 120 tapers towards the valve 110, such as those where the mouthpiece is reversibly stretchable, the cross-sectional area of the part 122 of the valve opener 120 at its widest point in the plane perpendicular to its longitudinal axis is greater than the cross-sectional area of the inlet 102 in the same plane when the mouthpiece is in an unstretched state. In these examples, the valve opener 120 can engage with the breath-sample container 100 in a substantially gas-tight manner at a portion of the part 122 of the valve opener 120 which has a cross-sectional area similar to that of the inlet 102 before the mouthpiece stretches, and then the mouthpiece can reversibly stretch to accommodate a wider portion of the valve opener 120 as it advances further towards the chamber 106 and reconfigures the valve 110 to its second open configuration 110b. Accordingly, the valve opener 120 engages with the breath-sample container 100 in a substantially gas-tight manner before the valve is reconfigured from the closed configuration 110c, and continues to engage with the breath-sample container 100 in a substantially gas-tight manner while the valve 110 is reconfigured to its second open configuration 110b.

In examples, the part 122 of the valve opener 120 is shaped such that, during engaging the valve opener 120 with the breath-sample container 100 in a substantially gas-tight manner, the part 122 of the valve opener 120 irreversibly deforms a portion of a wall of the valve 110 to configure the valve 110 to the second open configuration 110b. For example, as shown in FIGS. 3C and 4C, the part 122 of the valve opener 120 is shaped to irreversibly deform the second portion 118 of the wall of the valve 110 to configure the valve 110 to the second open configuration 110b. As described above, in examples the part 122 of the valve opener 120 is shaped to have a greater longitudinal extent 124 than the distance between the inlet 102 and the second portion 118 when the valve 110 is in the closed configuration 110c, such that during engaging the valve opener 120 with the breath-sample container 100 in a substantially gas-tight manner, the part 122 of the valve opener 120 engages with the second portion 118 of the wall to exert a pressure on the second portion 118 of the wall sufficient to irreversibly stretch the second portion 118 of the wall of the valve 110, thereby irreversibly configuring the valve 110 to the second open configuration 110b.

The valve opener 120 for example comprises a portion 136 configured to prevent over-insertion of the valve opener 120 into the inlet 102 of the breath-sample container 100. The portion 136 shown schematically in the Figures prevents over-insertion of the valve opener 120 into the inlet 102 because the portion 136 has a cross-sectional area in the plane perpendicular to the longitudinal axis of the valve opener 120 such that the portion 136 cannot enter the inlet 102 without excessive force/breaking of the mouthpiece of the breath-sample container 100. In examples, the portion 136 configured to prevent over-insertion of the valve opener 120 into the inlet 102 has a cross-sectional area greater than the greatest cross-sectional area of the part 122 of the valve 120 configured to open the valve 110 to its second open configuration 110b. In some examples, the portion 136 is a rib which extends along the plane perpendicular to the longitudinal axis of the valve opener 120. For example, when the valve opener 120 is engaged with the breath-sample container 100 in a gas-tight manner, the portion 136 is a rib which extends along the plane perpendicular to the axis C-C of the breath-sample container 100.

Figure 8:
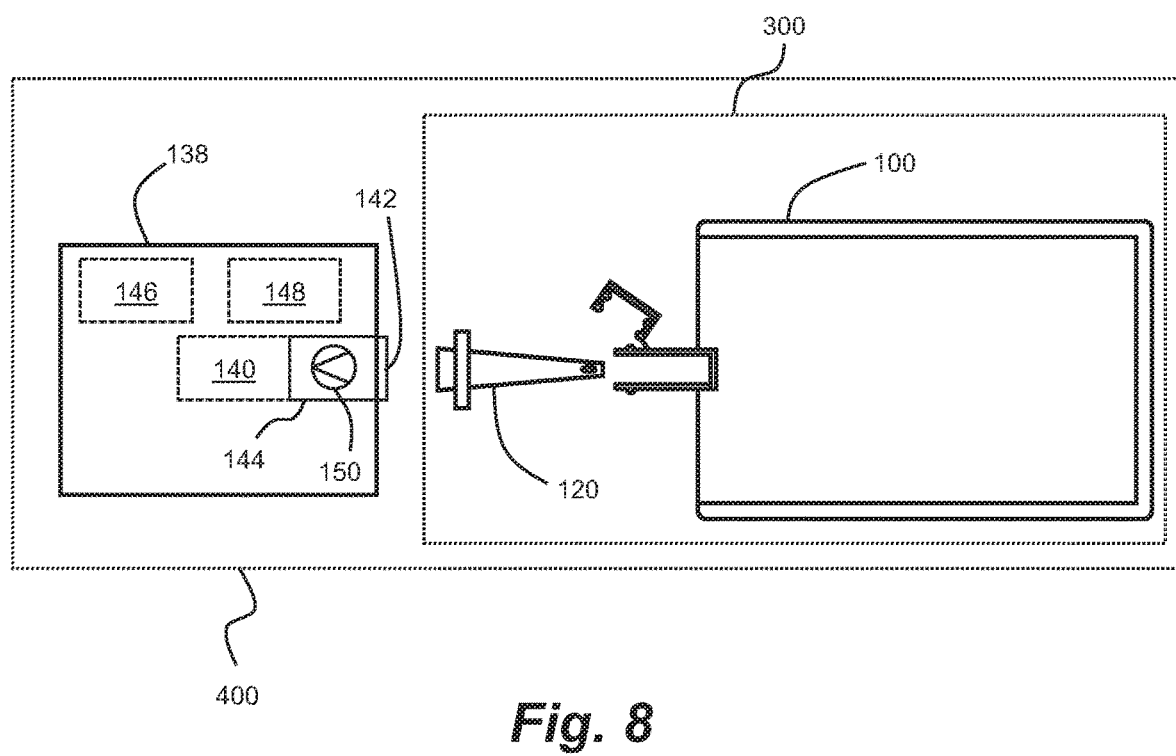
FIG. 8 shows schematically a breath sample analysis kit according to examples.

In examples, the breath sample kit is provided together with a breath-sample analyser, such as that labelled 138, to provide a breath sample analysis kit 400 as shown schematically in FIG. 8. The breath-sample analyser 138 comprises a sensor 140 for detecting analyte in a breath sample. For example, the breath-sample analyser 138 comprises a sensor 140 for detecting the amount/concentration of analyte in the breath sample. In examples, the sensor 140 is a NO sensor for detecting NO in a breath sample (e.g. available from Membrapor, Birkenweg 2 8304 Wallisellen, Switzerland).

The breath-sample analyser 138 comprises an inlet 142 for receiving a breath sample, and is e.g. engageable with the valve opener 120, directly or via a conduit such as a pipe. In some examples, the inlet 142 of the breath-sample analyser 138 is engageable with at least one outlet 134 of the valve opener 120. For example, the at least one outlet 134 of the valve opener 120 can be engaged with the inlet 142 of the breath sample analyser 138 in a substantially gas-tight manner, and the valve opener 120 engaged with the breath-sample container 100 in a substantially gas-tight manner such that at least one inlet 130, 132 of the valve opener 120 is located in the chamber 106, such that a breath sample contained in the chamber 106 can flow from the chamber 106 of the breath-sample container 100 to the inlet 142 of the breath sample analyser 138 via the at least one inlet 130, 132, the lumen 128, and the outlet 134 of the valve opener 120.

The breath-sample analyser 138 comprises a conduit 144 between the inlet 142 and the sensor 140, at least one processor 146, and at least one memory 148, in other words storage, comprising instructions which, when executed using the at least one processor 146, cause the breath-sample analyser 138 at least to determine, based on a signal output by the sensor 140, an amount of analyte in at least a portion of breath sample at the sensor 140. The sensor 140 is calibrated for use as the skilled person will understand, and associated calibration data can be stored in the at least one memory 148.

In examples, the breath-sample analyser 138 comprises a pump 150 for moving breath sample from the inlet 142 to the sensor 140. Such a pump 150 can also assist transfer of breath sample from the chamber 106 of the breath-sample container 100 to the inlet 142 of the breath-sample analyser 138. The pump 150 is operable to, with the inlet 142 of the breath-sample analyser 138 fluidly connected to the chamber 106, draw breath sample from the chamber 106 to the breath-sample analyser 138. The pump 150 is operable to transfer breath sample to the sensor 140 at a suitable flow rate for analyte analysis.

Figure 9:
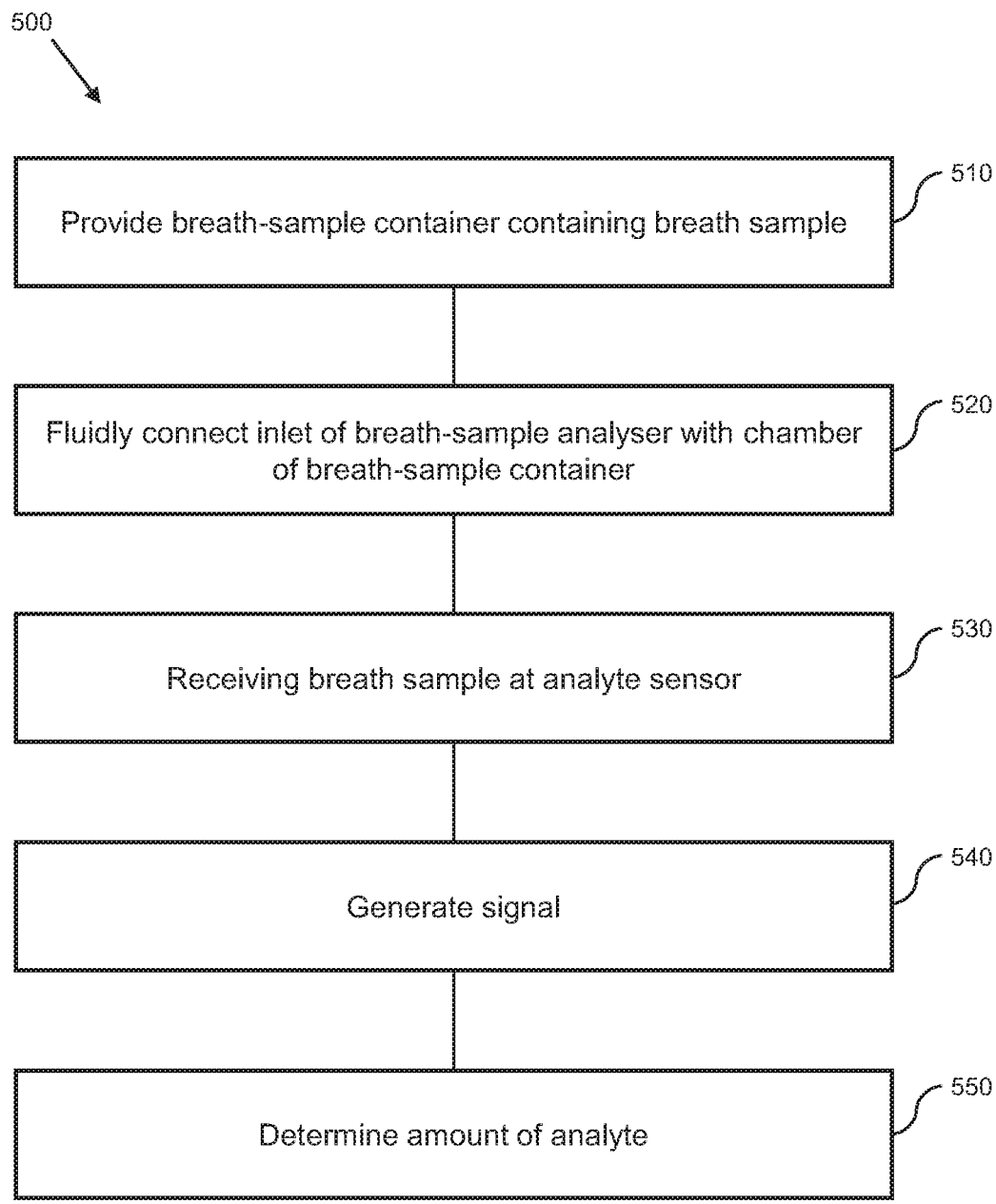
FIG. 9 shows schematically a flow diagram of example methods.

In examples, there is provided a method 500 of analysing concentration of an analyte in a breath sample. Referring to FIG. 9, the method 500 comprises providing 510 a breath-sample container. The breath-sample container is any breath-sample container according to the examples described above. The breath-sample container contains a breath sample. For example, a subject has supplied a breath sample to the chamber 106 of the breath-sample container 100 via the inlet 102 and the valve 110. In examples, the valve 110 of the breath-sample container 100 has not been configured in the second open configuration 110b; the valve 110 can reconfigure itself to the first open configuration 110a. In these examples, where the valve 110 is configurable to the closed confirmation 110c, the valve 110 can reconfigure itself from the first open configuration 110a to the closed configuration 110c by cessation of the breath sample flowing from the inlet 102 to the chamber 106.

The method 500 further comprises fluidly connecting 520 an inlet 142 of a breath sample analyser 138 with the chamber 106. The inlet 142 and the chamber 106 are fluidly connected in a substantially gas-tight manner. In examples, fluidly connecting 520 the inlet 142 and the chamber 106 comprises providing a conduit (e.g. a valve opener 120) between the chamber 106 and the inlet 142 of the breath sample analyser 138 such that analytes in the atmosphere cannot enter the breath sample during transfer of the breath sample from the chamber 106 of the breath-sample container 100 to the inlet 142 of the breath-sample analyser 138.

In examples, the fluidly connecting 520 comprises engaging a valve opener 120 with the breath-sample container 100 in a substantially gas-tight manner such that a part 122 of the adaptor 120 configures the valve 110 to the second open configuration 110b by irreversible deforming the valve 110, and fluidly connecting an outlet 134 of the valve opener 120 with the inlet 142 of the breath sample analyser 138 in a substantially gas-tight manner. The valve opener is any suitable valve opener according to the examples described hereinabove. In examples, the fluidly connecting of the outlet 134 of the valve opener 120 with the inlet 142 of the breath sample analyser 138 is carried out before the engaging the valve opener 120 with the breath-sample container 100. Carrying out the steps in this order can reduce the amount of breath sample that is contaminated/lost before analysis, as the valve 110 is not configured to the second open configuration 110b for extraction of the breath sample until the valve opener 120 has engaged with the inlet 102 of the breath-sample container 100 in a gas-tight manner.

The method 500 further comprises receiving 530 at least a portion of the breath sample at an analyte sensor 140 of the breath sample analyser 138. The receiving includes, for example, drawing at least a portion of breath sample from the chamber 106 over the analyte sensor 140, e.g. by operating a pump 150 comprised in the breath-sample analyser 138 to transfer breath sample to the sensor 140 from the chamber 106.

The method 500 further comprises the analyte sensor 150 generating 540 a signal indicative of the amount of analyte in the at least portion of the breath sample. The analyte sensor 150 outputs the signal, for example, to at least one processor 146 of the breath-sample analyser 138.

The method 500 further comprises, based on the signal, determining 550 the amount of analyte in the at least portion of the breath sample, for example using data stored in at least one memory 148 of the breath-sample analyser 138 which correlates different signal levels with different amounts of analyte.

In some examples, the method 500 further comprises determining a difference between a value indicative of the amount of analyte and a predetermined value, and attributing the difference to a clinical indication, e.g. determining that the amount of analyte in the breath sample is indicative of a clinical indication (for example by comparing the amount of analyte against a predetermined threshold value stored in the memory 148 of the breath-sample analyser 138 which is a minimum amount of analyte indicative of a clinical indication). In examples, the method 500 comprises the breath-sample analyser 138 visually and/or audibly indicating that the amount of analyte in the breath sample is indicative of a clinical indication.

The method 500 is for example a method of analysing concentration of NO in a breath sample: the analyte is NO, and the analyte sensor 150 is a NO sensor. The clinical indication is for example asthma or another inflammatory condition, e.g. a clinical indication which presents at least partially by a subject providing a breath sample comprising a greater amount of NO than a subject without the clinical indication.

The above examples are illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A breath-sample container comprising:
   an inlet for receiving a breath sample;
   a wall at least partially defining a chamber for containing the breath sample; and
   a valve between the inlet and the chamber, in fluid communication with the inlet and the chamber, the valve configurable between at least:
     a first open configuration for flow of breath sample from the inlet to the chamber up to a first flow rate;
     a second open configuration for flow of breath sample from the inlet to the chamber at a second flow rate greater than the first flow rate;
   wherein once the valve has been configured in the second open configuration, the valve cannot then reconfigure itself to the first open configuration.

2. The breath-sample container of claim 1, the valve further configurable to a closed configuration.

3. The breath-sample container of claim 2, wherein at least one of:
   the valve is configurable from the closed configuration to the first open configuration by a breath sample flowing from the inlet to the chamber;
   the valve is reconfigurable from the first open configuration to the closed configuration by cessation of a breath sample flowing from the inlet to the chamber; or
   once the valve has been configured in the second open configuration, the valve cannot then reconfigure itself to the closed configuration.

4. The breath-sample container of claim 1, wherein the valve is configurable to the second open configuration for extraction of breath sample from the chamber.

5. The breath-sample container of claim 1, wherein the valve is configurable to the second open configuration by irreversible deformation of the valve.

6. The breath-sample container of claim 5, wherein the irreversible deformation comprises at least one of:
   i) snapping or breaking a portion of the valve; or
   ii) stretching a portion of the valve.

7. The breath-sample container of claim 1, wherein the valve comprises, between the inlet and the chamber, a first portion of a wall of the valve comprising a slit openable for the first open configuration by sufficient pressure on at least a second portion of the wall of the valve.

8. The breath-sample container of claim 7, wherein at least one of:
   the slit is located at a first side of the valve, a second side of the valve being a least one of: (i) opposite, or (ii) immediately adjacent the first side comprising a material irreversibly deformable by sufficient pressure on the second portion of the wall of the valve; or
   the valve is configured such that, with the slit closed, the valve is substantially closed to gas flow between the inlet and the chamber.

9. The breath-sample container of claim 8, wherein the material is elastomeric plastic.

10. The breath-sample container of claim 1, wherein the breath-sample container comprises a folded sheet of material, a first wall of the breath-sample container comprising a first portion of the sheet and a second wall of the breath-sample container comprising a second portion of the sheet opposite the first portion of the sheet.

11. The breath-sample container of claim 1, wherein the wall is substantially impermeable to NO, $H_2$ and/or $CH_4$.

12. A breath sample kit comprising:
   a breath-sample container comprising:
     an inlet for receiving a breath sample;
     a wall at least partially defining a chamber for containing the breath sample; and
     a valve between the inlet and the chamber, in fluid communication with the inlet and the chamber, the valve configurable between at least:
       a first open configuration for flow of breath sample from the inlet to the chamber up to a first flow rate;
       a second open configuration for flow of breath sample from the inlet to the chamber at a second flow rate greater than the first flow rate;
     wherein once the valve has been configured in the second open configuration, the valve cannot then reconfigure itself to the first open configuration; and
   a valve opener engageable with the breath-sample container in a substantially gas-tight manner for flow of breath sample from the chamber towards the inlet of the breath-sample container, part of the valve opener configured to have opened the valve to the second open configuration once the valve opener has been engaged with the breath sample container in the substantially gas tight manner.

13. The breath sample kit according to claim 12 wherein at least one of:
   the part of the valve opener is elongate to extend at least partially through the inlet into the chamber with the valve opener engaged with the breath-sample container in a substantially gas-tight manner;
   with the valve opener having opened the valve to the second open configuration, at least one inlet of the valve opener is located in the chamber;
   the part of the valve opener is tapered such that, with the valve opener engaged with the breath-sample container in a substantially gas-tight manner, the part of the valve opener tapers towards the valve; or
   the part of the valve opener is shaped such that, during engaging the valve opener with the breath-sample container in a substantially gas-tight manner, the part of the valve opener irreversibly deforms a portion of a wall of the valve to configure the valve to the second open configuration.

14. The breath sample kit of claim 12, the valve opener comprising a lumen such that, with the valve opener engaged with the breath-sample container in a substantially gas-tight manner, the lumen fluidly communicates an inlet of the valve opener located in the chamber with an outlet of the valve opener outside of the chamber.

15. The breath sample kit of claim 12, wherein at least one of:

the valve opener comprises a portion configured to prevent over-insertion of the valve opener into the inlet of the breath-sample container; or the valve opener is engageable with the breath sample container via a friction fit with the inlet.

16. A breath sample analysis kit comprising:

a breath-sample container comprising:

an inlet for receiving a breath sample;

a wall at least partially defining a chamber for containing the breath sample; and a valve between the inlet and the chamber, in fluid communication with the inlet and the chamber, the valve configurable between at least:

a first open configuration for flow of breath sample from the inlet to the chamber up to a first flow rate;

a second open configuration for flow of breath sample from the inlet to the chamber at a second flow rate greater than the first flow rate;

wherein once the valve has been configured in the second open configuration, the valve cannot then reconfigure itself to the first open configuration; and a valve opener engageable with the breath-sample container in a substantially gas-tight manner for flow of breath sample from the chamber towards the inlet of the breath-sample container, part of the valve opener configured to have opened the valve to the second open configuration once the valve opener has been engaged with the breath sample container in the substantially gas tight manner; and a breath analyser.

17. The breath sample analysis kit of claim 16, wherein at least one of:

the breath analyser comprises a sensor for detecting analyte in the breath sample; or the breath analyser comprises a pump operable to, with an inlet of the breath analyser fluidly connected to the chamber, draw breath sample from the chamber to the breath analyser.

18. The breath sample analysis kit according of claim 17, wherein the sensor is a NO sensor for detecting NO in the breath sample.

19. A method of analysing concentration of an analyte in a breath sample, the method comprising:

providing a breath-sample container, the breath-sample container comprising:

an inlet for receiving a breath sample;

a wall at least partially defining a chamber, the chamber containing the breath sample; and a valve between the inlet and the chamber, in fluid communication with the inlet and the chamber, the valve configurable between at least:

a first open configuration for flow of breath sample from the inlet to the chamber up to a first flow rate;

a second open configuration for flow of breath sample from the inlet to the chamber at a second flow rate, the second flow rate greater than the first flow rate;

wherein once the valve has been configured in the second open configuration, the valve cannot then reconfigure itself to the first open configuration; and fluidly connecting an inlet of a breath sample analyser with the chamber;

receiving at least a portion of the breath sample at an analyte sensor of the breath sample analyser;

the analyte sensor generating a signal indicative of the amount of analyte in the at least portion of the breath sample; and based on the signal, determining the amount of analyte in the at least portion of the breath sample.

20. The method of claim 19, comprising at least one of:

(i) engaging a valve opener with the breath-sample container in a substantially gas-tight manner such that a part of the valve opener changes the valve to the second open configuration by irreversible deforming the valve; and fluidly connecting an outlet of the valve opener with the inlet of the breath sample analyser; or (ii) determining a difference between a value indicative of the amount of analyte and a predetermined value, and attributing the difference to a clinical indication.

* * * * *